United States Patent
Bailey et al.

(10) Patent No.: US 11,044,181 B1
(45) Date of Patent: Jun. 22, 2021

(54) DATA AGGREGATION, TRANSFORMATION AND VISUALIZATION OF NETWORKED BROADCAST REPORTS

(71) Applicant: Tektronix, Inc., Beaverton, OR (US)

(72) Inventors: James Ray Bailey, Brentwood, TN (US); David Leo Sulpy, Nashville, TN (US); Adam Matthew Reeves, Nashville, TN (US)

(73) Assignee: Initial State Technologies, Inc., Brentwood, TN (US)

( * ) Notice: Subject to any disclaimer, the term of this patent is extended or adjusted under 35 U.S.C. 154(b) by 814 days.

(21) Appl. No.: 15/226,732

(22) Filed: Aug. 2, 2016

(51) Int. Cl.
*G06F 16/24* (2019.01)
*H04L 12/26* (2006.01)
*H04L 29/08* (2006.01)
*G06F 16/248* (2019.01)
*G06F 16/2455* (2019.01)

(52) U.S. Cl.
CPC .......... *H04L 43/065* (2013.01); *G06F 16/248* (2019.01); *G06F 16/24568* (2019.01); *H04L 67/12* (2013.01)

(58) Field of Classification Search
CPC .......... G06F 11/1451; G06F 17/30371; G06F 11/1464; G06F 11/1469; G06F 2201/80; G06F 16/24
See application file for complete search history.

(56) References Cited

U.S. PATENT DOCUMENTS

| | | | | |
|---|---|---|---|---|
| 7,155,715 B1* | 12/2006 | Cui | ........................... | G06F 8/75 717/177 |
| 9,847,913 B2* | 12/2017 | Kanda | .................. | H04L 43/0817 |
| 10,606,856 B2* | 3/2020 | Bath | ................... | G06F 16/9038 |
| 10,652,349 B2* | 5/2020 | Matsuda | ................ | G06N 5/022 |
| 2007/0027367 A1* | 2/2007 | Oliver | ................. | A61B 5/0002 600/300 |
| 2011/0302196 A1* | 12/2011 | Bouillet | ............ | G06F 17/30516 707/769 |
| 2012/0197852 A1* | 8/2012 | Dutta | .................. | H04L 67/2804 707/692 |
| 2012/0197856 A1* | 8/2012 | Banka | .................... | H04L 67/12 707/706 |
| 2012/0197898 A1* | 8/2012 | Pandey | ............... | G06F 16/2264 707/741 |

(Continued)

*Primary Examiner* — Aleksandr Kerzhner
*Assistant Examiner* — Maher N Algibhah
(74) *Attorney, Agent, or Firm* — Cooley LLP; Andrew J. Harrington

(57) ABSTRACT

A server has a processor and a memory connected to the processor. The memory stores instructions executed by the processor to receive broadcast reports from a network, where each broadcast report includes an account identifier, a group identifier, a data stream identifier and a value. Each broadcast report is stored in a database as raw data. A request for information in the database is received. In response to the request, the raw data is altered in accordance with a predefined data transformation to produce transformed data. A first visualization of the transformed data associated with a first data stream identifier of a first group identifier is rendered. A second visualization of the transformed data associated with a second data stream identifier of the first group identifier is rendered. The first visualization is supplied in conjunction with the second visualization in response to the request.

15 Claims, 3 Drawing Sheets

(56) References Cited

U.S. PATENT DOCUMENTS

| | | | | |
|---|---|---|---|---|
| 2012/0197911 A1* | 8/2012 | Banka | ................... | H04L 67/12 |
| | | | | 707/752 |
| 2012/0314844 A1* | 12/2012 | Wiggers | ............... | A61N 5/1075 |
| | | | | 378/207 |
| 2013/0080843 A1* | 3/2013 | Stergiou | ................. | G06F 11/14 |
| | | | | 714/49 |
| 2014/0247142 A1* | 9/2014 | Proud | .................. | A61B 5/0024 |
| | | | | 340/870.02 |
| 2014/0359035 A1* | 12/2014 | Wang | ..................... | H04L 51/06 |
| | | | | 709/206 |
| 2016/0261465 A1* | 9/2016 | Gupta | ................. | H04W 12/121 |
| 2017/0359191 A1* | 12/2017 | Smith | ................. | H04L 12/2816 |
| 2017/0364818 A1* | 12/2017 | Wu | ........................ | G06N 7/005 |
| 2018/0197393 A1* | 7/2018 | Gallo | ..................... | G08B 21/12 |
| 2018/0211168 A1* | 7/2018 | Khurshudov | .......... | G06N 5/025 |
| 2019/0292044 A1* | 9/2019 | Carroll | ................. | A61B 5/0022 |

* cited by examiner

DATA AGGREGATION, TRANSFORMATION AND VISUALIZATION OF NETWORKED BROADCAST REPORTS

FIELD OF THE INVENTION

This invention relates generally to the processing of sensor signals broadcasted through a network. More particularly, this invention relates to data aggregation, transformation and visualization of networked broadcast reports.

BACKGROUND OF THE INVENTION

There is ongoing growth of electronic devices with network connectivity that allows for the exchange of data. This infrastructure is sometimes referred to as the internet of things or IoT. Examples of the electronic devices include temperature sensors, health monitoring implants, machine sensors and the like. In general, these devices are relatively inexpensive and therefore are susceptible to periodically generating erroneous data.

It is desirable to store data in a raw format to identify potentially faulty electronic devices. On the other hand, it is undesirable for periodic erroneous data to corrupt a data set that is otherwise largely accurate.

In view of the foregoing, there is an ongoing need for improved techniques for data aggregation, transformation and visualization of IoT data.

SUMMARY OF THE INVENTION

A server has a processor and a memory connected to the processor. The memory stores instructions executed by the processor to receive broadcast reports from a network, where each broadcast report includes an account identifier, a group identifier, a data stream identifier and a value. Each broadcast report is stored in a database as raw data. A request for information in the database is received. In response to the request, the raw data is altered in accordance with a pre-defined data transformation to produce transformed data. A first visualization of the transformed data associated with a first data stream identifier of a first group identifier is rendered. A second visualization of the transformed data associated with a second data stream identifier of the first group identifier is rendered. The first visualization is supplied in conjunction with the second visualization in response to the request.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
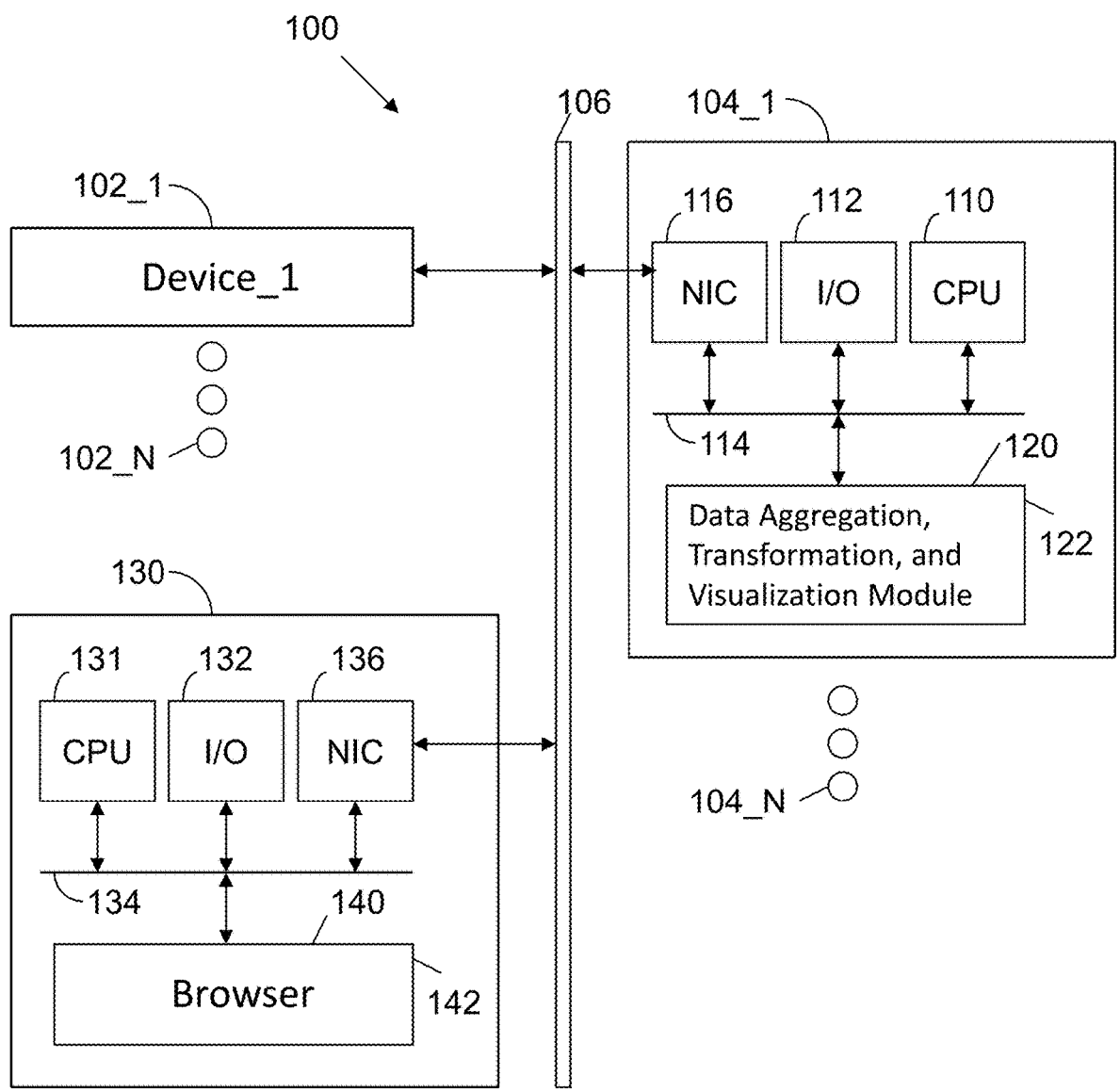
FIG. 1 illustrates a system configured in accordance with an embodiment of the invention.

FIG. 1 illustrates a system 100 configured in accordance with an embodiment of the invention. The system 100 includes a set of network connected devices 102_1 through 102_N, which broadcast reports to one or more servers 104_1 through 104_N via a network 106, which may be any combination of wired and wireless networks. Each device 102 is an IoT device that generates a broadcast report that includes an account identifier, a group identifier, a data stream identifier and a value. The value, such as a sensor reading, is associated with a data stream identifier. The data stream identifier allows for the accumulation of values, perhaps demarked with time stamps. The group identifier allows for the grouping of different data streams. The account identifier is a master repository for an account holder.

Server 104_1 includes standard components, such as a central processing unit 110 and input/output devices 112 connected via a bus 114. The input/output devices 112 may include a keyboard, mouse, touch display and the like. A network interface circuit 116 provides connectivity to network 106. A memory 120 is also connected to the bus 114. The memory 120 stores instructions executed by the central processing unit 110. In particular, the memory 120 stores a data aggregation, transformation and visualization module 122 to implement operations disclosed herein.

A client device 130 is also connected to the network 106. The client device, which may be a computer, tablet, smartphone and the like includes standard components, such as a central processing unit 131, input/output devices 132, a bus 134, and a network interface circuit 136. A memory 140 is connected to the bus 134. The memory 140 stores a browser 142 to access server 104_1. A user of the client device 130 may request information from a database associated with the data aggregation, transformation and visualization module 122. The module 122 services the request and provides one or more visualizations that reflect output from one or more of devices 102_1 through 102_N.

Figure 2:
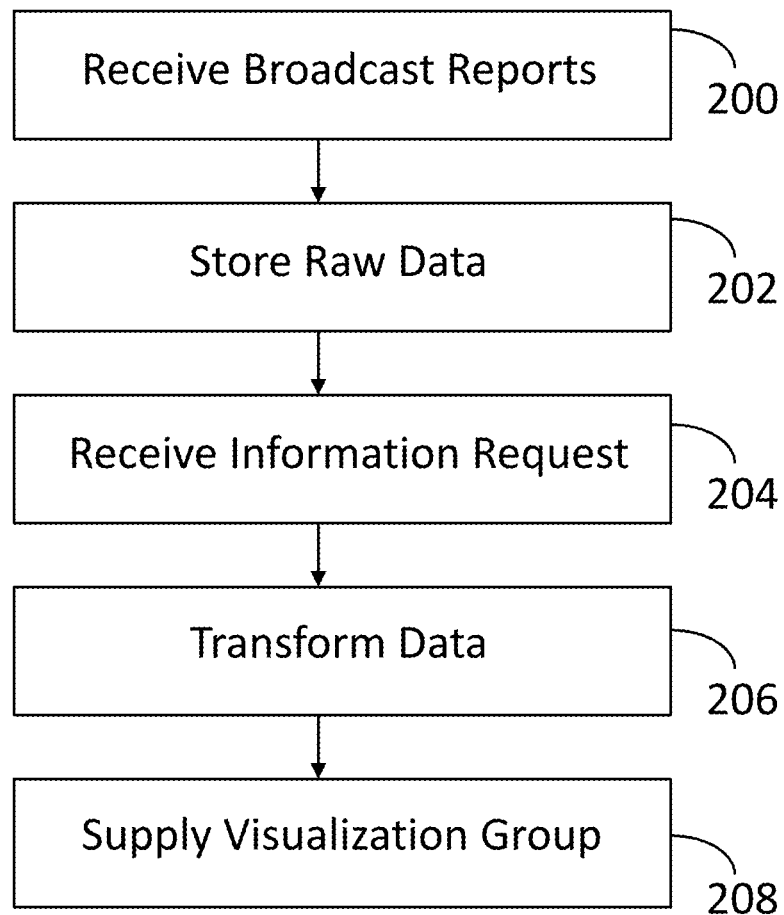
FIG. 2 illustrates processing operations performed in accordance with an embodiment of the invention.

FIG. 2 illustrates processing operations associated with an embodiment of the data aggregation, transformation and visualization module 122. Broadcast reports are received 200 from devices 102_1 through 102_N. Each device is configured to send data to the server 104_1. This may be done through a representational state transfer (REST) application program interface (API), message queue telemetry transport (MQTT) broker or custom protocol. Each broadcast report includes an account identifier, a group identifier, a data stream identifier and a value. Each broadcast report is stored in a database as raw data 202. Thus, even erroneous data is stored in the format in which it was received for archival purposes.

An information request is received 204. The information request may be from client device 130, which requests data from one or more of devices 102_1 through 102_N. For example, a user may log into a web application with a user name and password that is associated with an account identifier.

The requested data is retrieved from the data store and is transformed 206. That is, the raw data is altered in accordance with a pre-defined data transformation to produce transformed data. The pre-defined data transformation may be based upon an equation, a filter, a statistical function, a user-defined function and/or a data type transformation (e.g., integer to floating point). The pre-defined data transformation is operative to eliminate erroneous or inconsistent data in the raw data. Accordingly, visualizations of the data or other data summaries are not corrupted by the inconsistent data. The techniques of the invention also facilitate unit transformations, statistics, general discovery, decoding and other applications.

The final operation of FIG. 2 is to supply a visualization group 208. For example, a first visualization of the transformed data may be rendered for a first data stream identifier associated with a first group identifier. A second visualization of the transformed data may be rendered for a second data stream identifier associated with the first group identifier. The visualization group may represent data fetched via a REST API at a specified polling rate (e.g., every second). Alternately, a connection may be established (e.g., a Web-Socket) and data is pushed into the connection.

Figure 3:
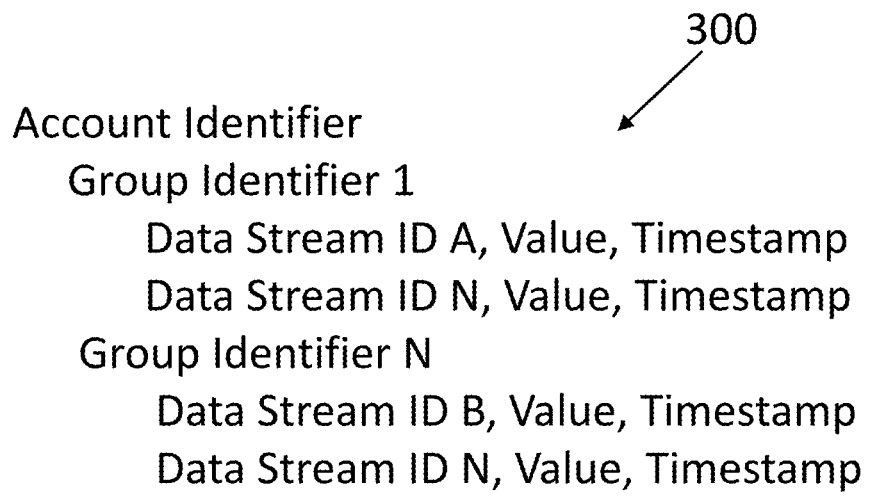
FIG. 3 illustrates database schema utilized in accordance with an embodiment of the invention.

FIG. 3 illustrates a database schema 300 to support disclosed operations. The database scheme 300 includes an account identifier. Each account may have groups of signals. Thus, as shown in FIG. 3, a first group identifier has data stream ID A through data stream ID N. Each data stream has an associated value and an optional timestamp. Similarly, another group identifier N has data stream ID B through data stream ID N, each with an associated value and optional timestamp. In an alternate embodiment, a group identifier is operative as an account identifier or is a combination of a group identifier and account identifier.

The values in database schema 300 are raw values. The supplied visualization has transformed data. Thus, the database schema 300 preserves raw data, but the user receives data transformed in response to a request. The raw data has a relatively small memory footprint, yet it provides the basis for transformed data observed by the user. The data transformations only upon request improve the functioning of the server since only on-demand processing is performed. Transformed data is not proactively created and stored. Thus, the server has a smaller computational and memory load. This approach also improves search time since less data is stored. Also observe that the raw data is transformed into a different state or thing in the form of a visualization with transformed values.

Figure 4:
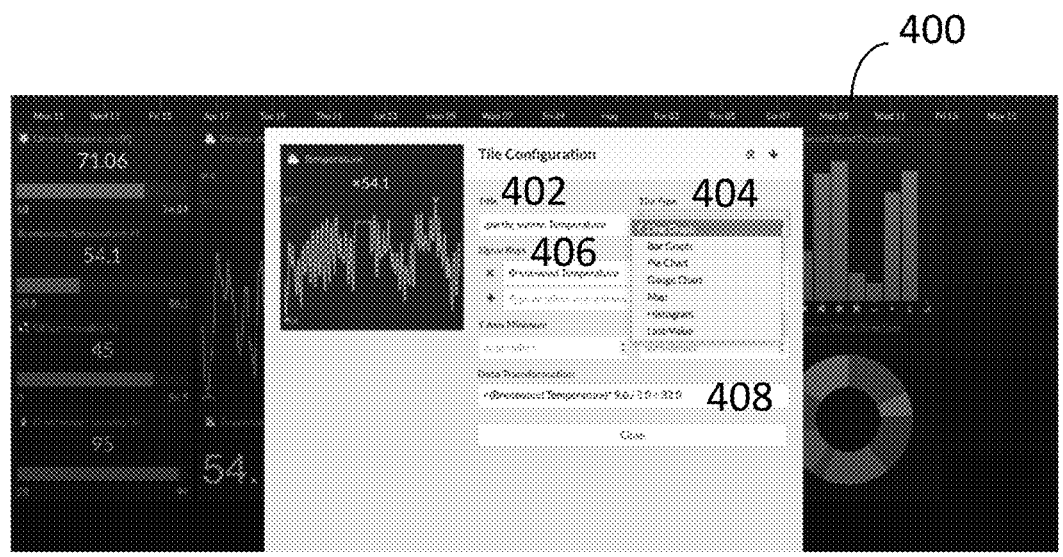
FIG. 4 illustrates a graphical user interface for visualization configuration.

FIG. 4 illustrates a graphical user interface 400 that may be used for configuring visualizations. A block 402 is supplied to specify a title for a visualization. A pulldown menu 404 is supplied to allow the user to specify a type of visualization (e.g., a line graph, a bar graph, a pie chart, a gauge chart, a map and a histogram). Block 406 allows one to specify a signal identifier. Block 408 allows a user to specify a data transformation. In this example, the data transformation is from a Celsius value to a Fahrenheit value.

Figure 5:
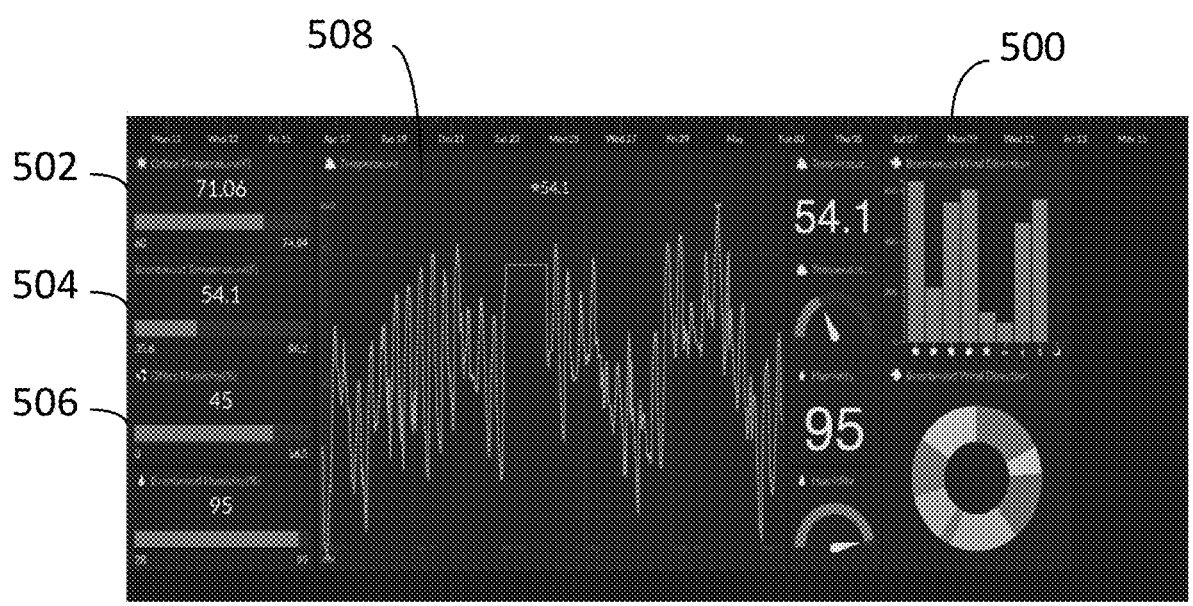
FIG. 5 illustrates visualizations rendered in accordance with an embodiment of the invention.

FIG. 5 illustrates an interface 500 with a set of visualizations 502, 504 and 506 in the form of bar graphs. Another visualization 508 is a line graph. By way of example, visualizations 502, 504 and 506 are associated with a first group identifier and represent three separate data streams. Visualization 508 has a separate group identifier that is associated with a single data stream.

An embodiment of the invention may include another visualization of the raw data superimposed upon the visualization of the transformed data or adjacent to the visualization of the transformed data. An embodiment of the invention may include two distinct visualizations of the same data (e.g., two separate visualizations for transformed data associated with a first data stream identifier with a first group identifier). An embodiment of the invention may include a visualization that combines transformed data from different data streams.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A server, comprising:
a processor; and
a memory connected to the processor, the memory storing instructions executed by the processor to:
receive broadcast reports from a network, each broadcast report including a group identifier, a data stream identifier and a value, wherein the group identifier identifies at least a group of at least one data stream, and the data stream identifier allows for accumulations of values,
store each broadcast report in a database as raw data,
receive a request for information in the database,
respond to the request by altering the raw data in accordance with a pre-defined data transformation to produce transformed data,
render a first visualization of the transformed data associated with a first data stream identifier of a first group identifier,
render a second visualization of the transformed data associated with a second data stream identifier of the first group identifier, and
supply the first visualization in conjunction with the second visualization in response to the request, the first visualization and the second visualization being of different forms.

2. The server of claim 1 wherein each broadcast report includes a time stamp.

3. The server of claim 1 wherein each broadcast report is from a network connected sensor.

4. The server of claim 1 wherein the pre-defined data transformation is based upon at least one of: an equation, a filter, a statistical function, a user-defined function, and a data type transformation.

5. The server of claim 1 wherein the first visualization and the second visualization are selected from a line graph, a bar graph, a pie chart, a gauge chart, a map, and a histogram.

6. The server of claim 1 further comprising instructions executed by the processor to respond to the request by supplying a third visualization of the raw data associated with the first data stream identifier of the first group identifier.

7. The server of claim 1 further comprising instructions executed by the processor to respond to the request by supplying a third visualization of the transformed data associated with the first data stream identifier of the first group identifier, wherein the third visualization is different than the first visualization.

8. The server of claim 1 further comprising instructions executed by the processor to respond to the request by supplying a third visualization of the transformed data associated with a plurality of different data stream identifiers of the first group identifier.

9. The server of claim 1, wherein the first visualization and the second visualization are separate from each other.

10. The server of claim 1, wherein one of the first visualization and the second visualization is superimposed on the other visualization.

11. The server of claim 1, wherein the database has a scheme that includes an account identifier, and each account identified by an account identifier has at least one group of signals stored.

12. The server of claim 11, wherein the account identifier is one of the group identifier or a combination of the group identifier and the account identifier.

13. The server of claim 1, wherein the server resides in a system having multiple network-connected devices.

14. The server of claim 13, wherein the multiple network-connected devices includes a client device.

15. The server of claim 13, wherein the multiple network-connected devices includes at least two IoT device.

* * * * *